United States Patent

[11] 3,569,882

| [72] | Inventor | Richard C. Mc Comb |
| | | Newington, Conn. |
| [21] | Appl. No. | 850,605 |
| [22] | Filed | Aug. 15, 1969 |
| [45] | Patented | Mar. 9, 1971 |
| [73] | Assignee | Veeder Industries, Inc. |
| | | Hartford, Conn. |

[54] ROTARY INDICATOR EMPLOYING ELECTROMAGNETIC STATOR HAVING RADIALLY OFFSET POLES
3 Claims, 7 Drawing Figs.

[52] U.S. Cl. ............................................. 335/272,
340/378, 335/281
[51] Int. Cl. ............................................. H01f 7/14
[50] Field of Search ................................. 340/378,
324 (Cursory), 325 (Cursory); 335/272, 281

[56] References Cited
UNITED STATES PATENTS
3,118,138  1/1964  Milas et al. .................. 335/272X 3,201,785  8/1965  Knotowicz..................... 340/324X
3,492,615  1/1970  Watkins........................ 335/272X

*Primary Examiner*—G. Harris
*Attorney*—Louis Orenbuch

ABSTRACT: An indicator has a permanent magnet secured to a drum to form a rotor which is able to turn to 180° opposed stations to permit the successive display of diametrically opposed symbols carried on the drum. The position of the rotor's permanent magnet is governed by a stator that can establish any one of a number of differently oriented magnetic fields. The stator has an even number of uniform poles protruding inwardly from an annular core. The poles are regularly spaced around the entire annular core and are arranged in pairs whose inner ends are diametrically opposed. The inwardly protruding poles, instead of being radial, are offset from and parallel tp diametral lines dividing the annular core into equal segments. The offset arrangement of poles insures the presence of a turning force on the rotor whenever the rotor is commanded to turn to the 180° opposite station.

Patented March 9, 1971
3,569,882
3 Sheets-Sheet 1
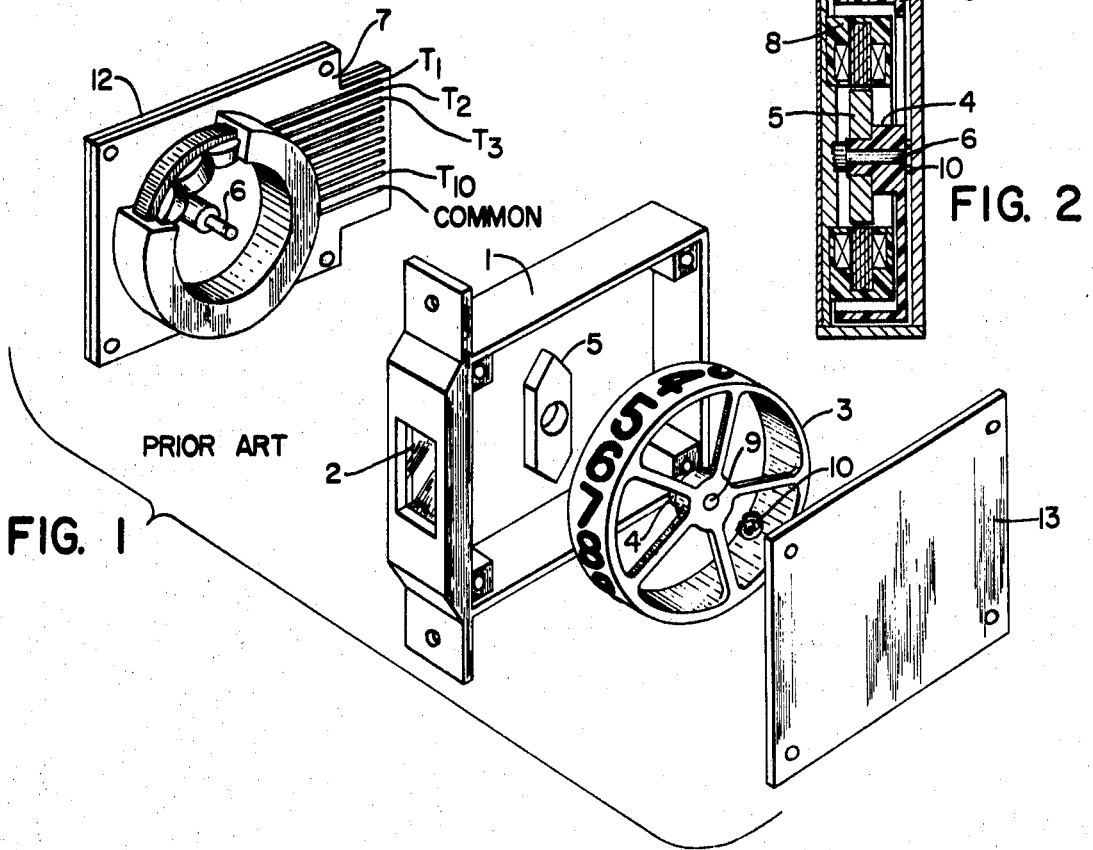
FIG. 1 PRIOR ART
FIG. 2
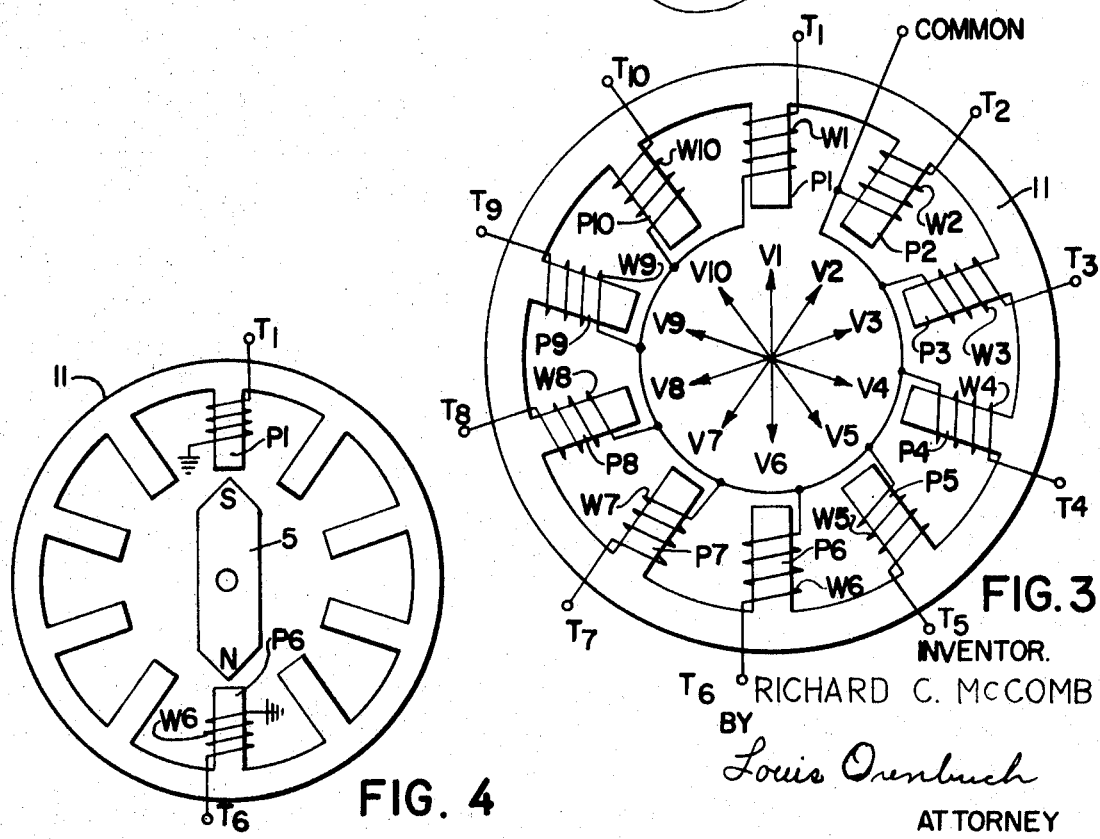
FIG. 3
FIG. 4
INVENTOR.
RICHARD C. McCOMB
BY
Louis Orenbuch
ATTORNEY Patented March 9, 1971 3,569,882

INVENTOR
RICHARD C. McCOMB
BY Louis Orenbuch
ATTORNEY

Patented March 9, 1971

INVENTOR
RICHARD C. McCOMB
BY
Louis Orenbuch
ATTORNEY

ROTARY INDICATOR EMPLOYING ELECTROMAGNETIC STATOR HAVING RADIALLY OFFSET POLES

FIELD OF THE INVENTION

This invention relates in general to indicators of the type having symbols marked upon the drum of a rotor that can turn to bring any of the symbols into a display station. More particularly, the invention pertains to indicators in which the orientation of the rotor is governed by an electromagnetic stator that can be energized by an electrical signal to establish any one of a number of discretely oriented magnetic fields. The invention is concerned with indicators in which the rotor must be able to successively assume 180° opposite positions to permit diametrically opposed symbols on the drum to be displayed in succession. In such electromagnet indicators, it is usual to employ symbols, such as arabic numerals or alphabetic characters, that are of uniform height. To permit the symbols to be of maximum size, the symbols are regularly spaced around the entire circumference of the drum. Where there are an even number of symbols, each symbol is diametrically opposite another symbol. That arrangement utilizes the peripheral surface area of the drum as fully as possible, but requires that the drum be capable of turning to a 180° opposite position where diametrically opposed symbols are displayed in succession. The invention insures the application of a tuning force on the rotor whenever the rotor is required to assume a 180° opposite position.

DISCUSSION OF THE PRIOR ART

Electromagnetic indicators of the type upon which this invention is an improvement employ a rotor having a permanent magnet attached to the drum. The orientation of the rotor is governed by an electromagnetic stator having poles protruding radially inwardly from an annular ferromagnetic core. For each symbol on the drum, there is a uniquely oriented magnetic field that can be established by electrically energizing the windings which surround the radial poles. The rotor is mounted to turn about an axis at the geometric center of the annular core. In response to the establishment by the stator of a discretely oriented magnetic field, the permanent magnet constrains the rotor to turn until the magnet becomes aligned with the stator's field. The symbol bearing drum is fixed to the permanent magnet and, when the magnet is aligned with the stator's field, a symbol is in register with the display station. Usually, the display station is a window in a housing which permits only one drum symbol at a time to be visible in its entirety. The rotor, in prior art indicators, tends to "hang-up" when it is next required to display the diametrically opposite symbol. That is, the rotor initially tends to move sluggishly or not at all when it is commanded to turn to the 180° opposite position.

To avoid hang-up of the rotor, prior art indicators are provided with "offset" as taught by U.S. Pat. Nos. 2,943,313; 3,311,911; 3,411,155; and 3,392,382. The use of "offset" requires that the permanent magnet first align itself with the stator's magnetic field and then move to an offset position when the stator's magnetic field decays upon cessation of the "command" electrical signal. The use of "offset" is effective in avoiding hang-up of the rotor, but requires additional apparatus such as the phasing windings of U.S. Pat. No. 3,311,911, or the magnetic detent pins of U.S. Pat. No. 2,943,313 or modified permanent magnets as in U.S. Pat. Nos. 3,311,911 and 3,392,382. In the continuous mode of indicator operation, the stator is almost continuously electrically energized as the termination of one signal is usually rapidly followed by the impress of another electrical signal. The use of "offset" tends to slow the indicator operation when used in that mode because sufficient time must be allotted between command signals to permit the rotor to move to an "offset" position before the next signal occurs. In addition to slowing continuous mode operation, an indicator having "offset" is characterized by a "blink" of the symbol in the window (as in FIGS. 8 and 10 of U.S. Pat. No. 3,411,155). The blink occurs when the rotor turns from its field aligned position to its offset position. The blink is a characteristic that accompanies indicators having "offset." Efforts have been made to provide a nonblinking indicator in which the rotor does not hang-up when 180° rotation is required. For example, U.S. Pat. No. 3,419,858 discloses an indicator employing magnetizable pins on the rotor to assure a turning moment on the rotor.

OBJECTIVES OF THE INVENTION

The principle objective of the invention is to provide a nonblinking indicator in which the presence of a turning force on the rotor is assured whenever the rotor is required to turn to a 180° opposite position. Another objective of the invention is to assure the presence of that turning force in a nonblinking indicator that can operate rapidly in both the intermittent and continuous modes. The invention, essentially, resides in the arrangement of the poles that protrude inwardly from the stator's annular core.

THE DRAWINGS

The invention, both as to its construction and its manner of operation, can be better understood from the following exposition when it is considered in conjunction with the accompanying drawing in which:

FIG. 1 is an exploded view of an electromagnetic indicator employing a conventional radial pole stator;

FIG. 2 is a cross-sectional view of the assembled FIG. 1 indicator;

FIG. 3 is a schematic representation of the conventional radial pole stator used in the FIG. 1 indicator;

FIG. 4 illustrates the alignment of the rotor's permanent magnet with opposed poles of the conventional radial pole stator;

Figure 5:
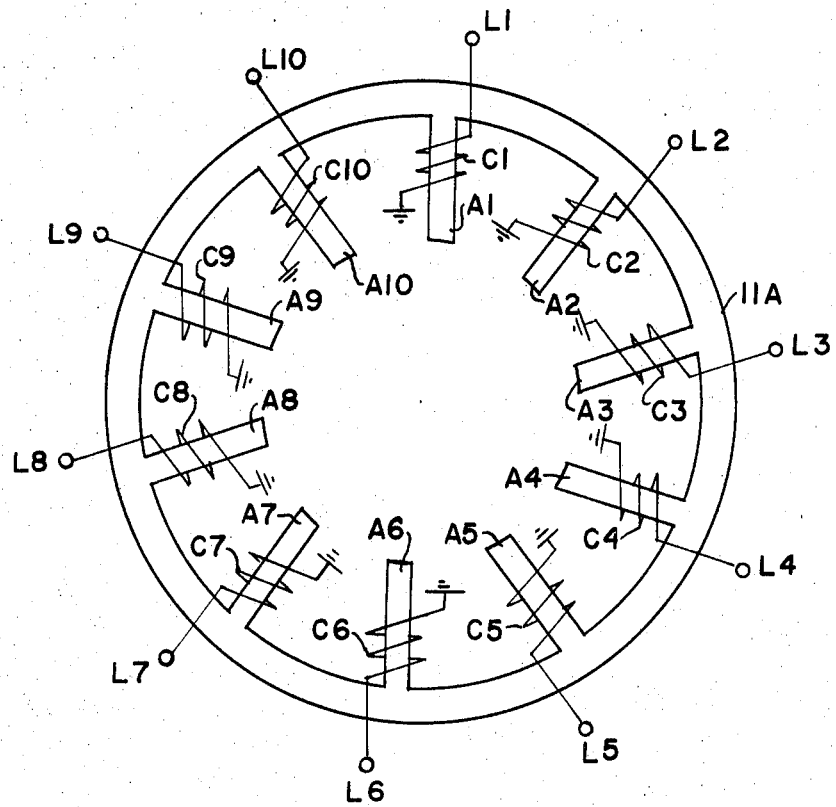
Figure 6:
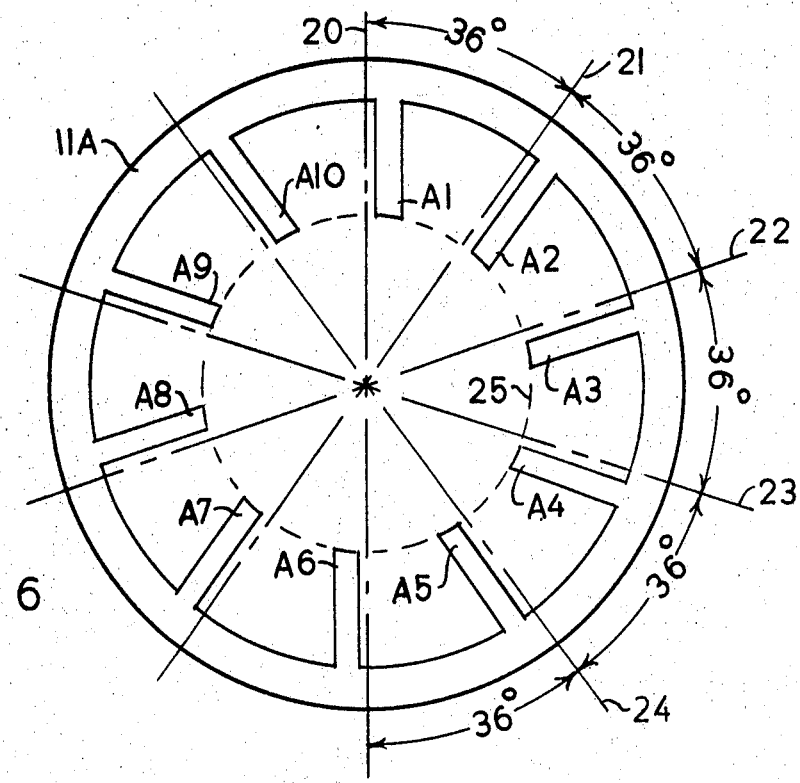
Figure 7:
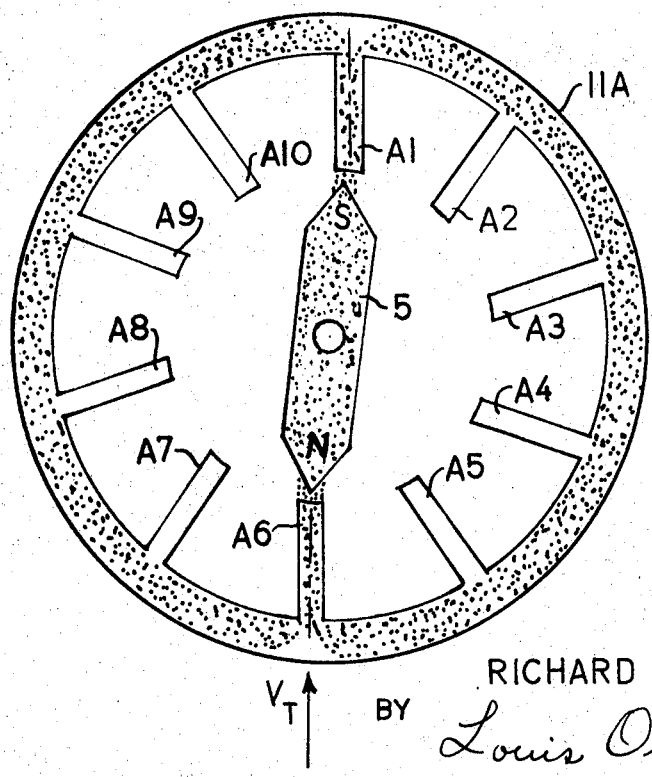

FIG. 5 schematically depicts a stator having inwardly protruding poles arranged in accordance with the invention;

FIG. 6 shows the relation of the inwardly protruding poles to diametral lines dividing the core into equal segments; and FIG. 7 illustrates the operation of the invention.

THE EXPOSITION

FIG. 1 shows an indicator of conventional construction employing a housing 1 having a front panel containing a window 2 for displaying symbols marked upon periphery of a drum 3. The drum 3 has a hub 4 to which a permanent magnet 5 is secured, as shown in the sectional view of FIG. 2. The drum and permanent magnet form a rotor that is mounted to turn as a unit about a shaft 6. The shaft is secured to a board 7 and extends through the geometric center of an annular stator 8. The hub 4 has a central bore 9 which permits the rotor to be mounted on the shaft. To retain the rotor so that it cannot slip off the shaft, a groove is provided near the shaft's end and the groove is engaged by a C-shaped lock member 10.

In the conventional indicator, the permanent magnet is symmetrical in shape because a symmetrical form conduces to the balance of the rotor. That is, the rotor is usually finely balanced to turn freely about the shaft 6 and the use of a magnet that is symmetrical with respect to the axis of rotation aids in the attainment of that objective. The permanent magnet may be of the bar shape shown in FIG. 1 or the magnet may have some other symmetrical shape such as round or oval. Whatever the form, in the conventional indicator, the magnetic poles of the permanent magnet are 180° apart with respect to the magnet's axis of rotation. Further, in the conventional indicator the permanent magnet's axis of rotation is disposed precisely at the geometric center of the annular stator 8.

Referring now to FIG. 3, the stator of the conventional indicator is schematically depicted. That stator has an annular ferromagnetic core 11 from which 10 poles P1, P2....P10 protrude radially inward. The core and the radial poles are formed by laminations to reduce eddy current losses. That is, the annulus and its radial poles are stamped as an integral piece from a sheet of ferromagnetic material and a number of the stampings are assembled to form the laminated core structure. The radial poles are identical and are arranged symmetrically around the annulus so that each pole is diametrically opposite another radial pole. Each of the 10 poles is surrounded by its own winding, symbolically indicated in FIG. 3 by the windings W1, W2....W10. The windings are arranged to permit each of them to be separately energized by applying an electrical signal to it. Conventionally, each winding has one end connected to a COMMON line and the electrical signals applied at the input terminals T1, T2....T10 to the windings are all of the same polarity with respect to the COMMON potential. The core 11 and the windings are usually embedded in a matrix of a synthetic resin (viz., a "plastic" substance). The synthetic resin holds the windings fixed upon the radial poles and helps to dissipate the heat generated by the current flow in the windings. In FIG. 3, the stator is shown without its plastic embedment.

By separately energizing each of the stator windings W1, W2....W10, 10 magnetic fields can be established, each of which is oriented in a different direction. Assuming for example that winding W1 of the stator is electrically energized to cause pole P1 to be North magnetic, all the other poles, P2 to P10, become South magnetic. A field is thereby established having its magnetic flux lines extending from the South magnetic poles toward the North magnetic pole. That magnetic field can be represented by a vector V1 whose direction is toward the North magnetic pole and whose length is a measure of the magnetic field intensity. Because of the symmetrical arrangement of the radial poles, the line of action of vector V1 passes through the geometric center of the annular core and centrally through pole P1. Permanent magnet 5, which is within the magnetic field, rotates about shaft 6 into alignment with the V1 vector and assumes the position depicted in FIG. 4, where the South pole of the permanent magnet is adjacent to pole P1. With the magnet aligned, as indicated in FIG. 4, with the V1 vector, one of the symbols on the drum 3 is positioned in the window of the housing 1.

By separately energizing each of the stator windings, 10 discretely oriented magnetic fields, represented by the vectors V1, V2....V10 in FIG. 3, can be established and thereby any one of 10 symbols on the drum can be brought into display position in the window of the housing. Each symbol on the drum is of such size that it completely fills the window so that only one symbol can be in registration with the window at any time. For expository purposes, the symbols are assumed to be the arabic numerals 0, 1, 2,....9 and it is assumed that the display of numeral 1 is governed by the vector V1, the display of numeral 2 is governed by vector V3, and so on. It is evident from FIG. 3 that each of the vectors has its line of action extending through the geometric center of the annular core and that each vector is in line with another vector extending in the 180° opposite direction. Because of that vectorial arrangement, the numerals on the drum 3 are disposed such that each numeral is diametrically opposite another numeral on the drum. For an even number of numerals, the diametrically opposite placement of the symbols on the drum permits the most efficient use of the drum's peripheral surface. That is, the numerals can be of the maximum size as the symbols can be regularly spaced around the entire 360° periphery of the drum.

Assuming permanent magnet 5 has rotated into alignment with radial poles P1 and P6 as indicated in FIG. 4, upon termination of the electrical signal to winding W1, the magnetic field established by the stator collapses. The rotor, however, retains its aligned position because of the attractive force between the poles of the permanent magnet and the adjacent radial poles P1 and P6 of the stator. The indicator, in essence, then has a memory because the rotor remains in position after the input signal to the stator has ended and retains that position until the rotor is commanded to take another position by energizing a different winding on the stator. In the interval between the application of "command" signals, the stator is electrically unenergized. That mode of operation is the intermittent mode.

In the continuous mode of operation, an electrical signal is impressed on winding W1, for example, during the entire period that the numeral 1 is to be displayed. When another symbol is to be displayed, the electrical signal to winding W1 is immediately succeeded by the impress of an electrical signal of the same polarity to some other winding of the stator. Where the display of numeral 1 is to be succeeded, for example, by the display of numeral 6, the signal applied to winding W1 is terminated and the W6 winding is then excited by an electrical signal impressed at terminal T6. The rotor which was originally aligned as depicted in FIG. 4, must then turn through 180° to align itself with vector V6. In the conventional indicator, there is no turning moment present to cause the rotor to turn because the resultant force acting on the permanent magnet is directed through the rotor's axis of rotation. That is, the forces of repulsion exerted on the permanent magnet's poles when winding W6 is electrically energized, are directed through the axis of rotation so that no unbalanced couple arises. The rotor, consequently tends to remain in position (viz., tends to "hang-up") and its initial turning motion, if it turns at all, is sluggish. Where consistently rapid operation of the indicator is desired, the tendency of the rotor to hang-up when commanded to turn to a 180° opposite position is a disadvantage in conventional indicators which is present in both modes of operation.

FIG. 5 schematically depicts an embodiment of the invention that is an improvement upon the previously described conventional indicator. The improvement retains the diametrically opposed symbol arrangement on the drum 3 while insuring the presence of a turning force on the permanent magnet when the rotor is commanded to turn to a 180° opposite position. The improvement resides in arranging the poles A1, A2....A10 around the annular core 11A, in the manner depicted in FIG. 5, whereby those inwardly protruding poles are evenly spaced around the entire circumference of core 11A but are not radial. As in the conventional indicator, each of the poles A1, A2....A10 is surrounded by its own winding C1, C2....C10 which can be separately electrically energized by applying an electrical signal to it through the COMMON terminal and one of the terminals L1, L2....L10.

For ease of exposition, it is convenient to consider the annular core 11A as being partitioned into equal segments by diametral lines 20, 21, 22, 23, 24 which are spaced apart at 36° intervals, as indicated in FIG. 6. It is further convenient to consider the poles which protrude from core 11A as being arranged in pairs with respect to those diametral lines. For example, stator poles A1 and A6 constitute a pair that extend inwardly parallel to diametral line 20 and have their inner ends terminating upon the circle 25 which is concentric with core 11A. The pole A1 as viewed in FIG. 6, is offset to the right with respect to diametral line 20 whereas pole A6 is equally offset to the left with respect to that diametral line. The two poles have their ends 180° apart although the poles are not diametrically aligned. The other stator poles are similarly situated with respect to diametral lines 21, 22, 23, and 24.

Upon energization of winding C1 to cause pole A1 to be North magnetic, permanent magnet 5 rotates into the position depicted in FIG. 7, where the magnet's South and North poles are adjacent to the inner ends of stator poles A1 and A6. The magnetic flux path is indicated by the stippling in FIG. 7. The magnetic flux from pole A1 is coupled by permanent magnet 5 to pole A6. The poles A2, A3, A4, A5, A7, A8, A9, and A10 are virtually excluded from the magnetic flux path by the easier path provided by the permanent magnet. If the signal to winding C1 is terminated and no other signal is applied to the stator, the rotor retains its position because that position offers the path of least reluctance for the magnetic flux of the permanent magnet. That is, the position of the permanent magnet depicted in FIG. 7 provides the path of least reluctance for the magnetic flux of the stator when winding C1 is electrically energized as well as the path of least reluctance for the permanent magnet when the stator is deenergized. Thus, upon deenergization of the stator, the permanent magnet holds its position.

Assuming that winding C6 is next energized by an electrical signal, magnet 5 is constrained to immediately rotate and turns to the 180° opposite position. A turning force is exerted on the permanent magnet immediately upon the energization of winding C6. The turning force arises because of the asymmetric arrangement of the stator's poles A1, A2....A10. Upon energization of winding C6, the path of least reluctance for the stator's magnetic flux is no longer through the permanent magnet 5. Rather, permanent magnet 5 becomes a path of high reluctance. The momentary configuration of the magnetic field that arises upon energization of winding C6 can be represented by a vector $V_T$ directed along the longitudinal axis of pole A6. The vector $V_T$ is not directed through the magnet's axis of rotation because pole A6 is radially offset. A force is, therefore, immediately exerted upon the magnet which causes the rotor to turn. When the permanent magnet 5 has rotated through 180°, its poles are again adjacent to stator poles A1 and A6 and the flux path of least reluctance is again through the permanent magnet. The vector $V_T$ is, consequently, shifted and its direction is then through the magnet's axis of rotation.

The arrangement of poles A1, A2....A10 illustrated in FIGS. 5, 6, 7 is especially advantageous in indicators of small size where space for the windings C1 to C10 must be efficiently used. In the illustrated arrangement, the poles are uniformly spaced apart so that the same amount of space occurs between any two adjacent poles. The uniform spacing then permits uniform windings to be efficiently disposed about each stator pole.

It is apparent to those skilled in the art that modifications can be made in the embodiment here described without departing from the essence of the invention. For example, the illustrated embodiment employs a permanent magnet whose salient magnetic poles are 180° apart with respect to the magnet's axis of rotation. It would be obvious to employ a magnet whose salient poles were at some other angle and to adjust the inwardly protruding poles of the stator to compensate for the departure from 180°. Further, the North and South salient poles of the permanent magnet are depicted as being equidistant from the rotor's axis of rotation so that the air gaps are the same at both ends of the magnet. It is obvious, however, that those air gaps need not be the same if it is desired that one pole of the permanent magnet have more influence than the other in determining the position of the rotor. In view of the numerous ways in which the invention can be embodied, it is not intended that the scope of the invention be restricted to the precise arrangement illustrated in the drawings and described in the exposition.

I claim:

1. In an electromagnetic indicator of the type utilizing:
   a stator having a plurality of poles protruding inwardly from an annular ferromagnetic core, the stator having windings arranged about the poles whereby the stator is capable of establishing any one of a plurality of discretely oriented magnetic fields by selective electrical energization of the windings; and
   a rotor having a magnet secured to a drum, the rotor being mounted to rotate about an axis at the geometric center of the annular core whereby the magnet is constrained by the stator's field to turn to a station providing the path of least reluctance between two poles of the stator, the improvement for assuring the presence of a turning force on the magnet whenever the rotor is required to turn to a 180° opposite station, the improvement residing in the arrangement of poles on the stator wherein:
   the plurality of inwardly protruding poles are disposed in pairs, each pair of poles having its inner ends diametrically opposed, and each pair of poles extending inwardly from the core parallel to and offset from a diametral line.

2. In an electromagnetic indicator according to claim 1, wherein:
   the rotor is further characterized in that the magnet has salient magnetic poles equidistant from the rotor's axis of rotation, and the improvement further resides in the arrangement of poles of the stator wherein:
   the plurality of poles all extend equally inwardly.

3. In an electromagnetic indicator according to claim 2, wherein:
   the drum of the rotor bears diametrically opposed symbols upon its periphery, the symbols being regularly spaced apart, and the improvement further resides in the arrangement of poles of the stator wherein:
   the inwardly protruding poles are regularly spaced around the entire annular core.